United States Patent [19]

Willett et al.

[11] Patent Number: 4,919,006
[45] Date of Patent: Apr. 24, 1990

[54] VISCOUS DIFFERENTIAL

[75] Inventors: Mark A. Willett, Novi; James P. McCarthy, Milford, both of Mich.

[73] Assignee: GKN Automotive, Inc., Auburn Hills, Mich.

[21] Appl. No.: 147,295

[22] Filed: Jan. 22, 1988

[51] Int. Cl.$^5$ ............................................. F16H 35/04
[52] U.S. Cl. .................................... 74/650; 192/58 B
[58] Field of Search ....................... 74/650, 711, 710.5, 74/710; 411/522, 513, 530, 539; 403/377; 180/248, 249; 192/58 B, 58 C, 58 R

[56] References Cited

U.S. PATENT DOCUMENTS

| Re. 29,854 | 12/1978 | Shealy | 74/711 |
|---|---|---|---|
| 2,883,884 | 4/1959 | Norton | 192/58 B X |
| 2,949,046 | 8/1960 | Critelli | 74/688 |
| 3,146,010 | 8/1964 | Dellith | 411/539 X |
| 3,396,605 | 8/1968 | Wilkinson et al. | 74/650 |
| 3,628,399 | 12/1971 | Seitz | 74/711 |
| 3,893,351 | 7/1975 | Baremor | 74/711 X |
| 3,938,408 | 2/1976 | Baremor | 74/711 |
| 3,987,689 | 10/1976 | Engle | 74/711 |
| 4,058,027 | 11/1977 | Webb | 74/711 |
| 4,286,686 | 9/1981 | Franke | 180/233 |
| 4,507,984 | 4/1985 | Goscenski, Jr. | 74/650 |
| 4,524,640 | 6/1985 | Neumann et al. | 74/650 |
| 4,545,456 | 10/1985 | Lake | 180/233 |
| 4,548,096 | 10/1985 | Giocastro et al. | 74/650 |
| 4,562,897 | 1/1986 | Renneker | 180/233 |
| 4,601,359 | 7/1986 | Weismann et al. | 180/233 |
| 4,605,087 | 8/1986 | Ashauer et al. | 180/248 |
| 4,609,064 | 9/1986 | Suzuki et al. | 180/233 |
| 4,650,028 | 3/1987 | Eastman et al. | 74/650 X |
| 4,721,010 | 1/1988 | Sheldon et al. | 74/650 |

FOREIGN PATENT DOCUMENTS

| 0167312 | 1/1986 | European Pat. Off. | |
| 236650 | 9/1987 | European Pat. Off. | 74/711 |
| 430321 | 6/1926 | Fed. Rep. of Germany | 74/650 |
| 2160624 | 12/1985 | United Kingdom | 192/58 B |

Primary Examiner—Dwight G. Diehl
Assistant Examiner—Chris Campbell
Attorney, Agent, or Firm—Remy J. VanOphem

[57] ABSTRACT

A limited slip viscous differential in which the housing therefor is gearingly connected with the drive axle and rotates therewith. Each of two output axles from the limited slip viscous differential is connected internally to a viscous coupling for transferring torque from the drive axle to at least one of the two output axles when at least one of the two output axles is rotating an angular velocity different from that of the housing. A structure is provided for releasably retaining each of the output axles within the housing.

41 Claims, 5 Drawing Sheets

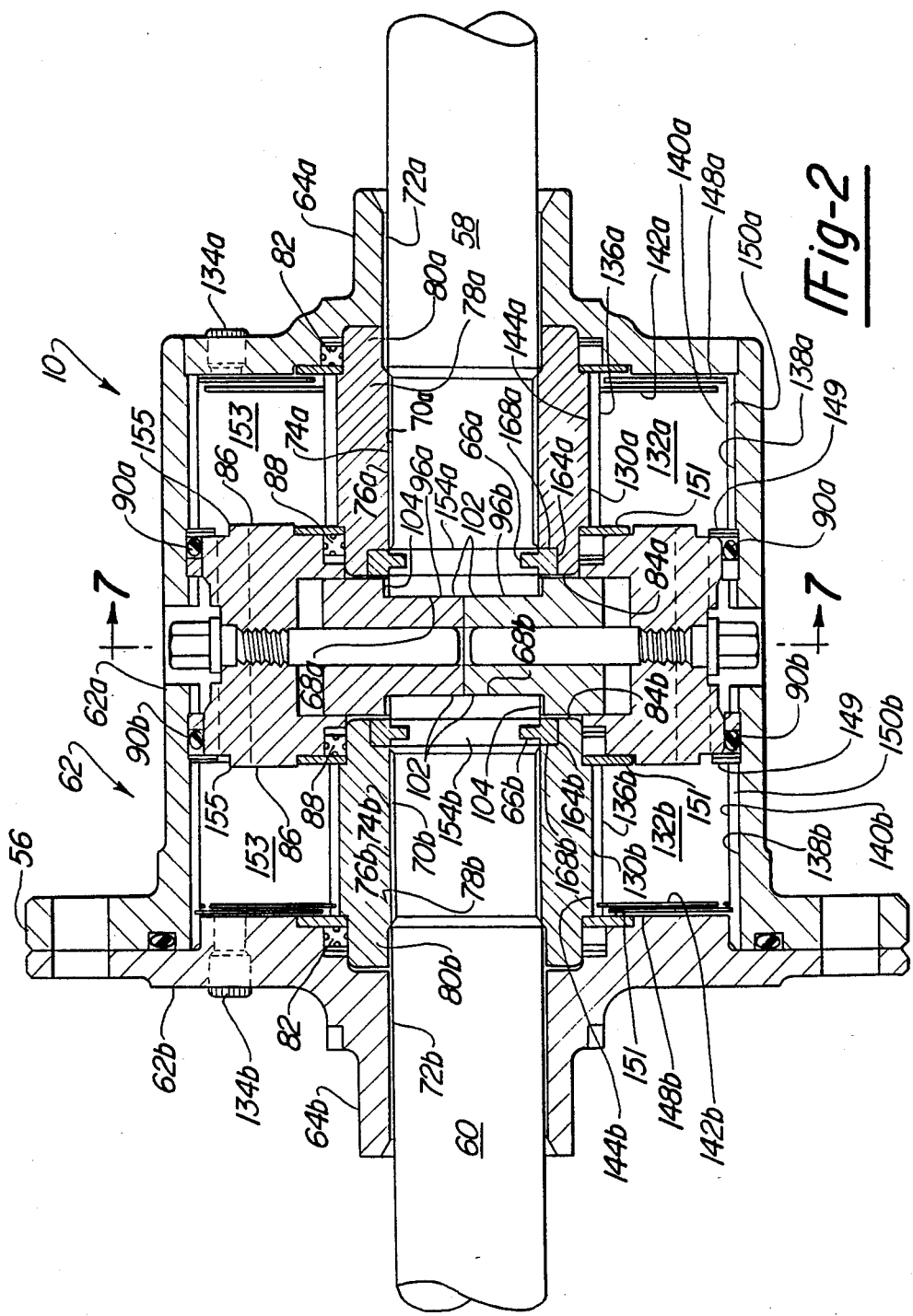

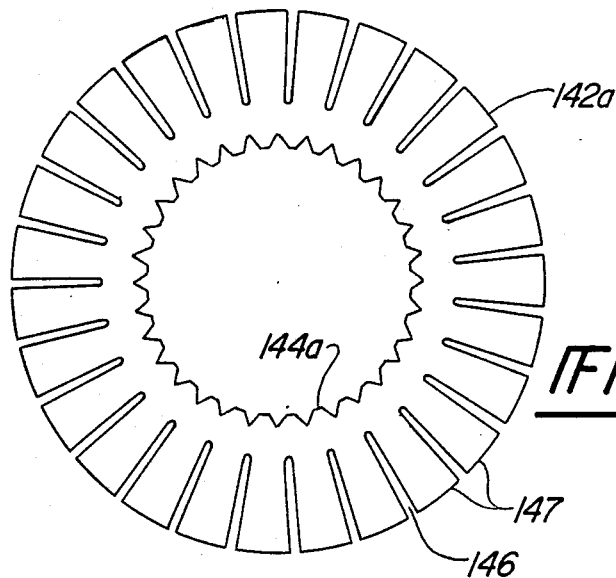
*Fig-8*
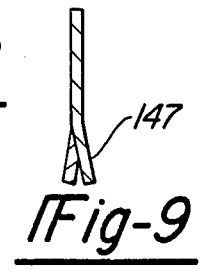
*Fig-9*
*Fig-10*
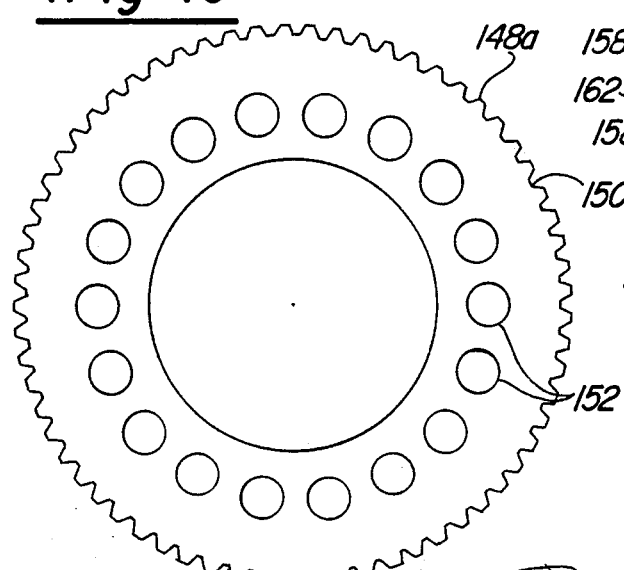
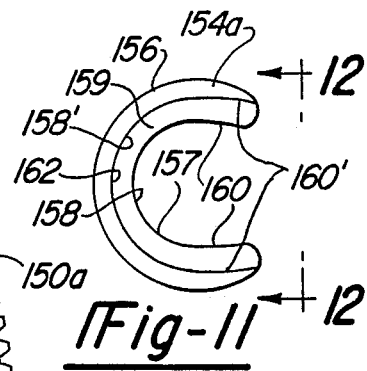
*Fig-11*
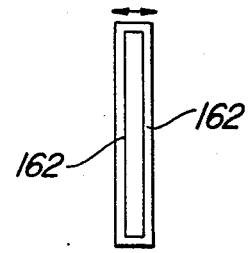
*Fig-12*
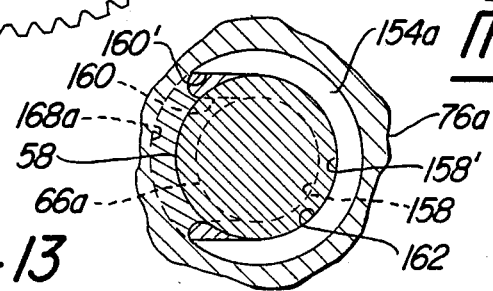
*Fig-13*

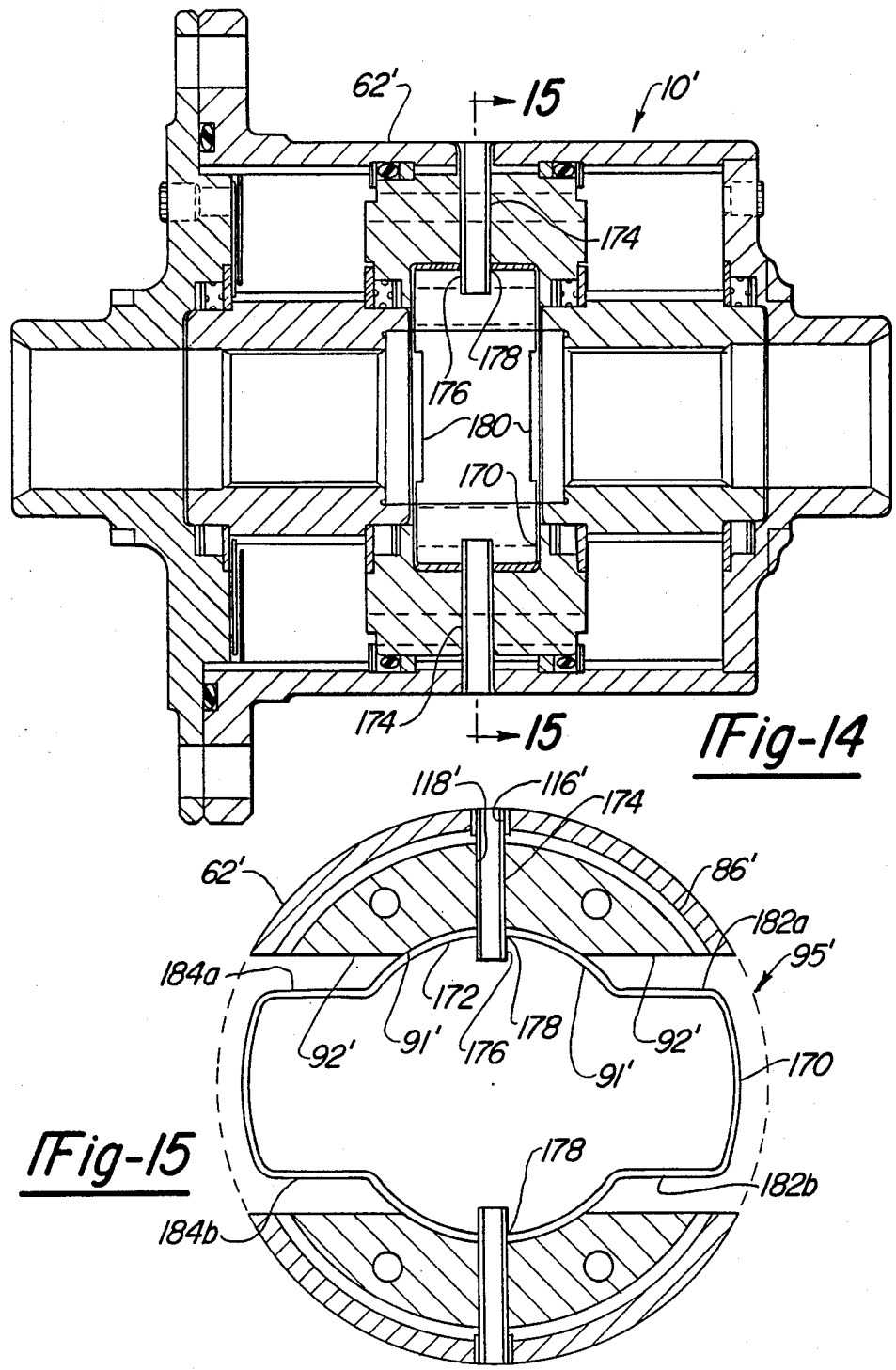

VISCOUS DIFFERENTIAL

BACKGROUND OF THE INVENTION

1. Field of the Invention

This invention relates to viscous differentials and particularly to a viscous differential which has provision for releasable mounting to the axles of a vehicle.

2. Description of the Prior Art

Differentials are provided in vehicle drive trains in order to permit drive wheels to turn at different speeds. This is necessary because if each of the drive wheels were to turn at the same rate, scuffing on the road surface would result during common maneuvers, such as making a turn. Attendant to this capacity of a differential, a drive wheel which encounters a slippery road surface will receive the majority of torque of the drive train while the drive wheel which has good traction will not. This circumstance, frequently encountered on icy and wet roads, can lead to situations in which the vehicle becomes stuck. The use of four-wheel drive systems has the advantage that all four wheels will receive torque from the drive train. However, four-wheel drive systems must allow for individual wheel rotation if this system is to used for other than only off-road purposes.

Accordingly, what is required is a limited slip differential that can allow for limited differential drive wheels to rotate at different rates during normal driving conditions and also deliver torque to the drive wheel or drive wheels which have the best traction even though one or more of the other drive wheels have less traction due to a slippery road surface.

One means to accomplish limited slip is to mechanically link the two drive wheels in a two-wheel drive system or all four wheels in a four-wheel drive system, effectively bypassing the differential. In a turn, such a vehicle drive train will result in tire scuffing. Consequently, this drive train is best suited for off-road vehicle operation where terrain conditions make this a preferred system.

In the prior art, it has been found that control of the coupling between the drive wheels to maximize friction with the road surface and yet permit differentiation between the drive wheels is best accomplished by selectively coupling the drive wheels so that part-time four-wheel drive is available when needed. These systems utilize either mechanical couplings or viscous couplings to accomplish control of wheel differentiation.

In mechanical couplings, a control is used to engage and disengage a direct mechanical connection between the drive wheels. Examples of these systems are as follows: U.S. Pat. No. 4,609,064 to Suzuki discloses a four-wheel drive system which electronically senses when the vehicle is making a turn and thereupon changes the drive train from four-wheel drive to differential two-wheel drive. U.S. Pat. No. 4,058,027 to Webb and U.S. Pat. No. 4,286,686 to Franke disclose a friction plate coupling between the drive wheels which is actuated by a hydraulic clutch. U.S. Pat. No. 4,545,456 to Lake discloses a four-wheel drive system which has a selectable chain drive member that uses cams to engage a spline connection to the front wheels. U.S. Pat. No. 4,524,640 to Neumann et al discloses a differential having hold out rings which keep an overrunning axle (as would occur during a turn) disengaged from a spider drive member. Finally, U.S. Pat. No. 3,987,689 to Engle discloses a limited slip differential having a rotatable casing and an actuator for engaging friction clutch plates when a predetermined level of relative rotation is present.

In viscous couplings, interleave plates within a viscous fluid are used to selectively interconnect the drive wheels. The controls therefor may be either manually selective or automatically selective. U.S. Pat. No. 2,949,046 to Critelli is exemplary of a viscous coupling differential, wherein a housing contains a planetary and orbit gear differential, a first series of annular plates attached to one drive wheel axle, a second set of annular plates, interleaved with the first set of annular plates, attached to the other drive wheel axle and a high viscous fluid which fills the housing. When one of the drive wheels encounters a slippery road surface which results in wheels slipping, relative rotation among the annular plates causes viscosity of the fluid to increase, transmitting torque to the drive wheel axle which has the best traction.

In the prior art, many improvements have been made to the basic type of viscous differential that is represented by Critelli. Examples of these improvements are as follows: U.S. Pat. No. 4,605,087 to Ashauer et al discloses a viscous coupling between the front and rear wheels of a vehicle, and, in addition, a coupling device which disengages the viscous coupling to the rear wheels during severe braking. U.S. Pat. No. 4,562,897 to Rennecker discloses a viscous coupling between the front and rear wheels of a vehicle which is selectable between a disengaged setting, an engaged setting, and a disengaged setting having in addition direct mechanical connection between the front and rear wheels. U.S. Pat. No. 4,601,359 to Weismann et al discloses an on demand front wheel drive which incorporates two differentials, one for the front wheels and one for the front to the rear wheels. The front to rear differential includes a viscous coupling which delivers torque to the set of drive wheels having the best road traction. European Patent 0,167,312 to Diggins discloses a viscous coupling between three coaxial rotatable members, where two of the three coaxial members have annular plates that interleave annular plates of the third coaxial member.

Particularly relevant to the present invention are the following patents. U.S. Pat. No. 4,548,096 to Giocastro et al discloses a fluid torque converter located at the wheel hub having a demountable axle using a key and nut arrangement. U.S. Pat. No. 4,650,028 to Eastman et al discloses a part-time on demand four-wheel drive system wherein a single viscous coupling apparatus is incorporated in the vehicle rear axle serving as both an interaxle differential, dividing the engine torque between the front and rear axles, as well a limited slip rear differential. The viscous coupling has an outer drum circumferentially surrounding a pair of left and right drums, each respectively connected to the left and right rear axles. Annular plates connected to the outer drum are interleaved with annular plates connected to the left and right drums. A mechanical linkage to the front axle is provided by gearing between a driving bevel gear and a crown gear connected to the outer drum. When a slippage condition exists in the front drive wheels, relative rotation between the annular plates in the viscous coupling will transfer torque to the rear wheels. Further, relative rotation between the rear wheels will adjust torque between the rear wheels to the wheel having the best traction.

There remains in the prior art a need to devise an on demand limited slip differential which incorporates both an interaxle and a limited slip differential that has provision for releasable connection to the drive wheel axles.

SUMMARY OF THE INVENTION

The present invention is a limited slip viscous differential. The housing therefor is gearingly connected with the drive axle and rotates therewith. Each of two output axles has a viscous coupling for transferring torque from the drive axle to at least one of the two output axles when at least one of the two output axles is rotating at an angular velocity different from that of the housing. A structure is provided for releasably retaining each of the two output axles within the housing.

The two output axles consist of a first axle having an annular slot adjacent one end thereof and a second axle having an annular slot adjacent one end thereof. The housing has a first hub at one end thereof for receiving the first axle and has a second hub at the other end thereof for receiving the second axle. The housing further has a surface of cylindrical shape. The housing is gearingly connected to the third drive axle.

A first drum is rotatably mounted in the housing adjacent the first hub. The first drum has an outer surface spaced from the inside surface of the housing, the outer surface of the first drum and the inner surface of the housing defining a first chamber. The first drum has an annular recess adjacent one end thereof. The first drum further has an inner surface that is splined which meshes with splines on the first axle.

A second drum is rotatably mounted in the housing adjacent the second hub. The second drum has an outer surface spaced from the inside surface of the housing, the outer surface of the second drum and inner surface of the housing defining a second chamber. The second drum has an annular recess adjacent one end thereof. The second drum is spaced from the first drum thereby forming an interaxle space. The second drum further has an inner surface that is splined which meshes with splines on the second axle.

A first set of first chamber annular plates is attached to the outer surface of the first drum. A second set of first drum annular plates is attached to the inner surface of the housing, the second set of first drum annular plates interleaving the first set of first drum annular plates.

A first set of second drum annular plates is attached to the outer surface of the second drum. A second set of second drum annular plates is attached to the inner surface of the housing, the second set of second drum annular plates interleaving the first set of second drum annular plates.

A high viscosity fluid is located within the first and second chambers for transferring torque from the third axle to at least one of the first and second axles when at least one of the first and second axles rotate at an angular velocity that is different from that of the housing. A bulkhead is located in the housing for at least partially separating the first chamber from the second chamber. The bulk head and the housing have cut-outs which define a substantially rectangular cavity.

A first "C" clip is receivable by the annular slot in the first axle and the annular recess in the first drum, such that when the first axle protrudes into the interaxle space, the first "C" clip is receivable by the annular slot in the first axle and when the first axle no longer protrudes into the interaxle space the first "C" clip is retainingly receivable by both the annular slot in the first axle and by the annular recess in the first drum to prevent the first axle from sliding in a direction outward from the housing. A second "C" clip, which is identical with the first "C" clip, functions similarly for the second axle with regard to the annular recess in the second drum and the annular slot in the second axle.

A pair of thrust blocks are removably retained in the substantially rectangular cavity. Each thrust block of the pair of thrust blocks has an elongate rectangular portion having a recess portion on either side thereof, and a right angle extension portion integral with the elongate rectangular portion. The pair of thrust blocks are placed side by side in mutually opposing orientation within the substantially rectangular cavity such that the first and second axles are retainingly received by the recess portions, thereby preventing the first and second axles from sliding in a direction inward in relation to the housing.

Accordingly, it is an object of the present invention to provide a viscous coupling for a vehicle having an on demand limited slip differential which incorporates both an interaxle differential and a limited slip differential.

It is a further object of the present invention to provide a viscous coupling for a vehicle having an on demand limited slip differential which has provision for releasable connection of the drive wheel axles.

It is yet a further object of the present invention to provide a viscous coupling for a vehicle between the front and rear wheel axles which automatically transfers drive train torque to the wheel or wheels having the best road traction when a wheel spinning condition is present, and yet permits essentially free-wheel differentiation when a wheel spinning condition is not present.

These and other objects, advantages, features, and benefits of the invention will become apparent from the following specification.

BRIEF DESCRIPTION OF THE DRAWINGS

FIG. 2 is a fragmentary sectional view of the viscous coupling according to the present invention;

FIG. 8 is front view of an annular plate having inner splines according to the present invention;

FIG. 9 is a part detail view of the outer peripheral teeth of the annular plate of FIG. 8;

FIG. 10 is a front view of an annular plate having outer splines according to the present invention;

FIG. 11 is a side view of a "C" clip according to the present invention;

FIG. 12 is an end view of a "C" clip according to the present invention along lines 12—12 of FIG. 11;

FIG. 13 is a part sectional side view of the "C" clip according to the present invention shown in operation;

FIG. 14 is a sectional side view of an alternative embodiment of the viscous coupling according to the present invention; and FIG. 15 is a part sectional end view of the alternative embodiment of the viscous coupling according to the present invention along lines 15—15 of FIG. 14.

DETAILED DESCRIPTION OF THE PREFERRED EMBODIMENT

Figure 1:
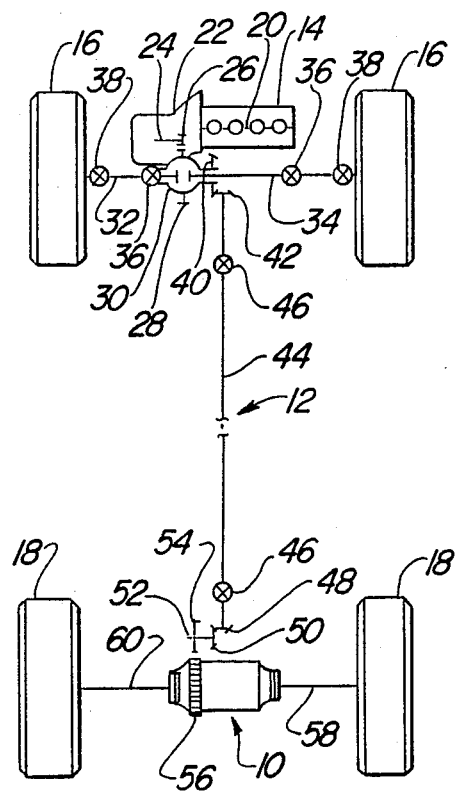
FIG. 1 is a schematic plan view of an on demand four-wheel drive system incorporating the present invention.

Referring now to the figures, FIG. 1 shows the viscous differential 10 according to the present invention in use with a motor vehicle drive train 12. The drive train is used to transfer torque from an engine 14 to a set of front wheels 16 and, through a connection to the viscous coupling of the present invention 10, to a set of rear wheels 18. A crankshaft 20 from the engine 14 delivers torque to a conventional transmission 22. The transmission includes a change speed gearbox with an output shaft 24. The output shaft 24 has an output pinion gear 26 in meshed relation to an input ring gear 28 of a conventional front wheel drive differential 30. The output shafts from the differential are each respectively connected to axles 32 and 34 of the front wheels. The front wheels are, in turn, connected to the differential through conventional constant velocity universal joints 36 and homokinetic tripod joints 38. The differential 30 has an output crown gear 40 meshed with an input cone gear 42 that is located at the forward end of a drive shaft 44. The drive shaft is provided with conventional universal joints 46. The rearward end of the drive shaft has an attached first bevel gear 48 which engages a second bevel gear 50. The second bevel gear rotates on a shaft 52 having connected thereto a pinion gear 54. The pinion gear, in turn, meshes with a ring gear 56 of the viscous coupling of the present invention 10. The viscous coupling, in turn, couples rear wheel axles 58 and 60 selectively to each other and the drive shaft 44, as will be explained hereinbelow.

Referring now to FIG. 2, the viscous differential 10 has a housing 62 which is assembled from two housing sections 62a and 62b by conventional fastening devices, such as bolts. Each of the housing sections has a hub, 64a and 64b respectively, for bearingly supporting the respective rear wheel axle 58 and 60.

Each of the axles 58 and 60 is provided with an annular slot 66a and 66b respectively, adjacent their respective ends 68a and 68b. Further, straight splines 70a and 70b are respectively provided on a portion of each of the axles 58 and 60, between the location of the respective annular slots 66a and 66b and bearing portions 72a and 72b, respectively, of the hub 64a and 64b.

The straight splines 70a of the axle 58 engage straight splines 74a on an inside surface 76a of a first drum 78a, which is rotatably mounted in the housing in concentric relation to the axle 58. Similarly, the straight splines 70b of the axle 60 engage straight splines 74b on an inside surface 76b of a second drum 78b, which is rotatably mounted in the housing in concentric relation to the axle 60. Each of the first and second drums are mounted at one end 80a and 80b, respectively, into the housing at an oil seal 82, each of which is, in turn, mounted to the housing 62. The other, inward ends 84a and 84b of each of the first and second drums is supported by a bulkhead 86 at an oil seal 88.

Figure 4:
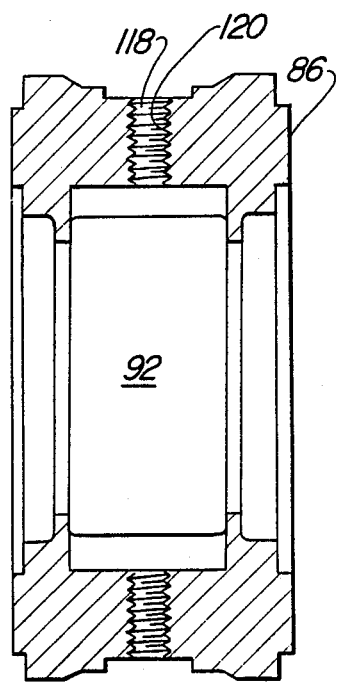
FIG. 4 is a sectional edge view of the bulkhead according to the present invention, along lines 4—4 of FIG. 3.

The bulkhead 86 has a generally annular shape. The outer periphery of the bulkhead contacts the housing 62 along two ring seals 90a and 90b. The center portion of the bulkhead has a generally rectangular cut-out 92 extending across the diameter of the bulkhead. As can be seen in particularity in FIGS. 3 and 4, the generally rectangular cut-out includes a part concave portion 91, as well as a straight portion 93. The housing 62 is also provided with two rectangular cut-outs 94 which are dimensionally matched with that of the cut-out 92 and the bulkhead. As can be understood from FIG. 3, which is a cross-sectional view through the center of the viscous differential 10, the substantially rectangular cut-out of the bulkhead and the rectangular cut-outs of the housing join to form a substantially rectangularly-shaped cavity 95 through the viscous differential 10. A pair of thrust blocks 96a and 96b are placed into the substantially rectangular shaped cavity 95.

Figure 5:
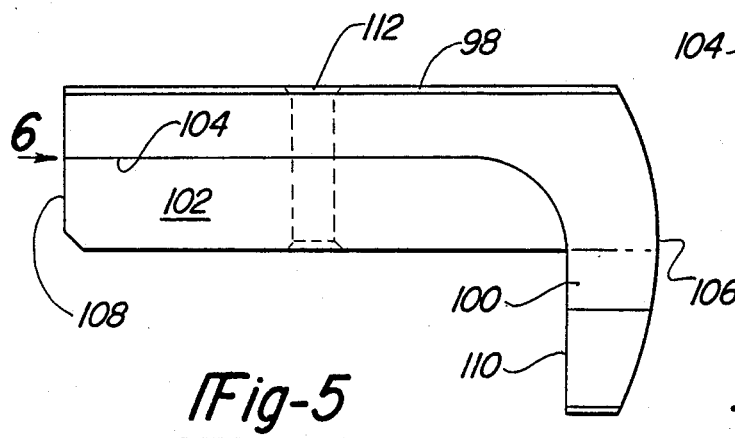
FIG. 5 is a side view of a thrust block according to the present invention.
Figure 6:
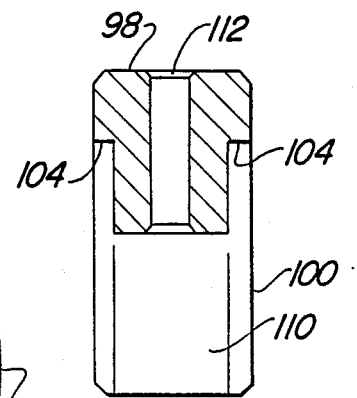
FIG. 6 is a part sectional end view of the thrust block according to the present invention along line 6 in FIG. 5.
Figure 7:
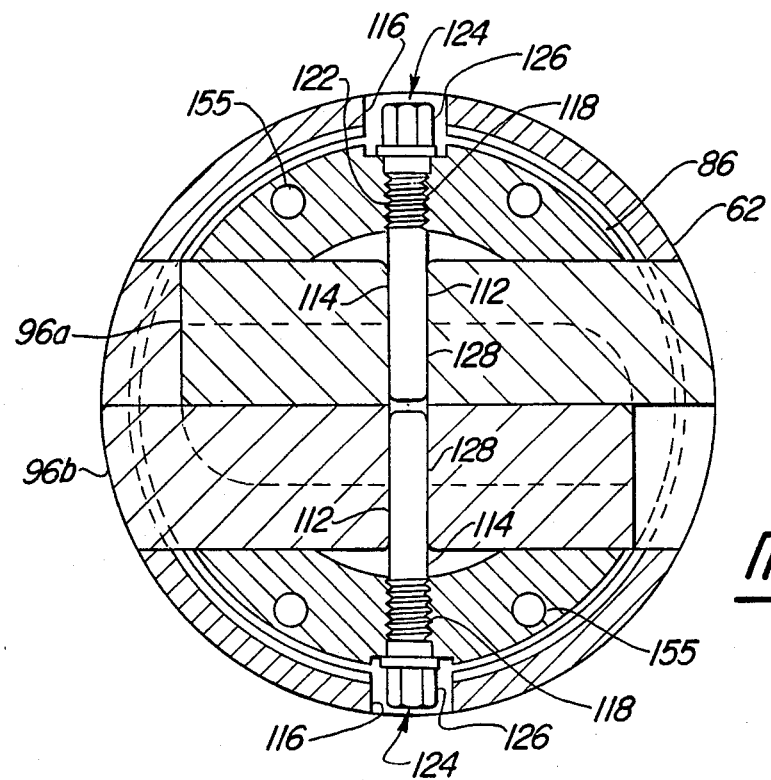
FIG. 7 is a sectional view of the viscous coupling according to the present invention along lines 7—7 in FIG. 2, now including thrust block and retainer pins according to the present invention.

The structure of each of the thrust blocks 96a and 96b can be understood by reference to FIGS. 5 and 6. As can be seen from the Figures, each of the thrust blocks has an elongate rectangular portion 98 and a right angle extension portion 100. The elongate rectangular portion 98 has, on each side, a recess portion 102 which forms a shoulder 104. The right angle extension portion 100 has an outer periphery having a part circularly shaped surface 106. The dimensions of the thrust blocks 96a and 96b permit them to be placed side by side in an opposing orientation and inserted into the substantially rectangularly-shaped cavity 95. As shown in FIG. 7, when the thrust blocks are mounted into the substantially rectangularly-shaped cavity 95, the part circularly shaped surface 106 of each of the thrust blocks complementarily follows the cylindrical shape of the outer surface of the housing 62. Further, the length of the elongate rectangular portion 98 is such as to cause an end 108 of one of the thrust blocks to contact the flat surface 110 of the right angle extension 100 of the other thrust block. The thrust blocks 96a and 96b are provided with a cylindrical bore 112 in the center of the elongate portion 98, which is oriented parallel with the flat surface 110 on the right angle extension portion 100. The recess portion 102 on each side of the thrust blocks allows the thrust blocks to be inserted into the substantially rectangularly-shaped cavity 95 even though a portion of the axles 58 and 60 extend into the substantially rectangularly-shaped cavity 95, the ends of the axles abutting the surface of the recess portion 102. The shoulder 104 is located to be adjacent a respective axle when the thrust blocks are located within the substantially rectangularly-shaped cavity 95. The structural relationship between the axles 58 and 60 with respect to the shoulder of the thrust blocks 96a and 96b can be particularly seen in FIG. 2.

Each thrust block 96a and 96b is provided with a retainer pin 114 which inserts into the cylindrical bore 112 in the elongate rectangular portion 98. The retainer pins keep the thrust blocks seated inside the substantially rectangularly-shaped cavity 95. A housing aperture 116 and a bulkhead aperture 118 are provided to allow the retainer pin to insert into the cylindrical bore 112 from outside the housing 62. Threads 120 are provided on the bulkhead aperture 118 which engage threads 122 on the head portion 124 of the retainer pin. The head portion 124 includes a bolt-like head 126 for engaging a wrench socket so that the threads of the retainer pin may be properly tightened onto the threads of the bulkhead. Each of the retainer pins has an elongated cylindrical portion 128 which inserts into the cylindrical bore 112 of the thrust blocks. Because the retainer pins are threadingly secured to the bulkhead, each of the thrust blocks 96a and 96b are secured in the substantially rectangularly-shaped cavity 95.

It will be seen from FIG. 2 that the outer surface 130a of the first drum 78a in conjuction with the housing 62 and the bulkhead 86 forms a first annular chamber 132a. Similarly, the outer surface 130b of the second drum 78b in conjunction with the housing 62 and the bulk head 86 forms a second annular chamber 132b. Both the first and second annular chambers are fluid tight by action of the seals 90a, 90b, 82 and 88. Filler caps 134a and 134b threadingly engage the housing and provide for selective fluidic sealing for each of the first and second annular chambers, respectively.

The outer surface 130a of the drum 78a includes splines 136a which are oriented parallel to the axis of the axles 58 and 60. An annular inner surface 138a at the housing which forms a portion of the first annular chamber also has splines 140a oriented in the same direction as the splines 136a. Similarly, the outer surface 130b of drum 78b includes splines 136b, which are oriented parallel to the axis of the axles 58 and 60. An annular inner surface 138b of the housing which forms a portion of the second annular chamber includes splines 140b oriented in the same direction as the splines 136b.

Located in the first annular chamber 132a is a first set of annular plates 142a having splines 144a on their periphery. An example of such an annular plate is shown in FIG. 8, where splines 144a on the inner periphery and slots 146 on the outer periphery are depicted. It is preferred that the teeth 147 of the annular plate shown in FIG. 8 be alternately bent in opposite directions as shown in FIG. 9. The splines 144a engage the splines 136a of the outer surface 130a of the first drum 78a. Each of the annular plates composing the first set of annular plates are separated by spacing rings (not shown) in a conventional manner. Located also in the first annular chamber 132a is a second set of annular plates 148a having splines 150a on their outer periphery. An example of an annular plate of this type is shown in FIG. 10 where splines 150a on the outer periphery and a plurality of annularly disposed apertures 152 are depicted. The splines 150a engage the splines 140a on the annular inner surface 138a of the housing 62. The annular plates composing the second set of annular plates interleave the annular plates composing the first set of annular plates. Further, each of the annular plates composing the second set of annular plates are separated by spacing rings (not shown) in a conventional manner.

In exactly the manner described for the first annular chamber 132a a first set of annular plates 142b having splines 144b on their inner periphery engage the splines 136b on the outer surface 130b of the second drum 78b. Further, a second set of annular plates 148b having splines 150b on their outer periphery engage the splines 140b on the inner surface 138b of the housing 62. The interleaving, spacing, numbering, configuration of the annular plates 142b and 148b of the second annular chamber match those described above for the first annular chamber.

Annular thrust washers 151 are used to absorb translational loads transmitted by the first and second drums to the housing and the bulkhead. Further, annular retainers 149 are used to protect the ring seals 90a and 90b from translational forces produced by the first and second sets of annular plates in each of the annular chambers. It is to be understood that the number, configuration and spacing of annular plates composing the first and second set of annular plates of each of the annular chambers is subjet to selection, as hereinafter described.

Figure 3:
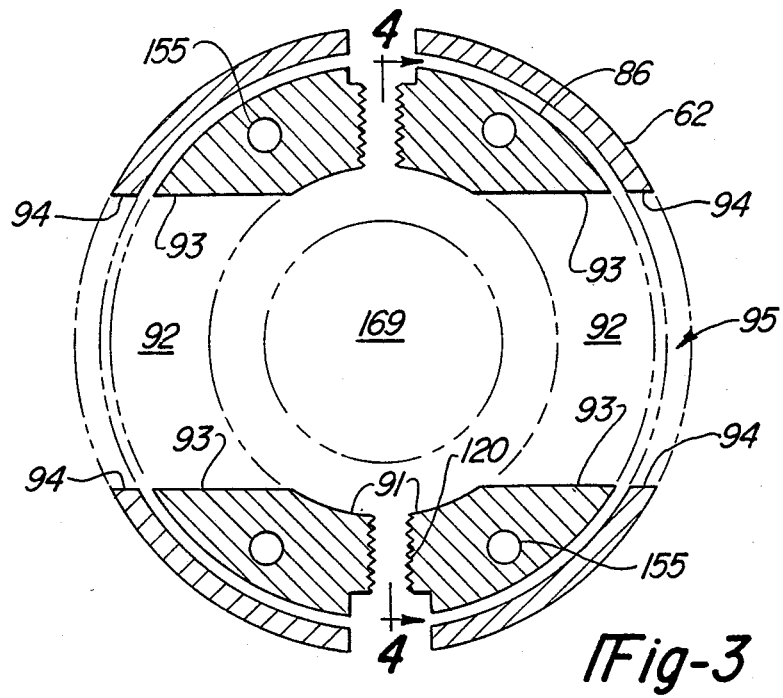
FIG. 3 is a sectional view of the bulkhead according to the present invention.

A high viscous fluid 153 is introduced into the first and second annular chambers through the filler caps 134a and 134b, respectively. A preferred fluid is silicone fluid having a viscosity of between 100,000 and 300,000 centi-stokes at 25° centigrade; chamber fill is preferred to be between 75% and 90% full. It is to be understood that variations from the preferred criteria are contemplated within the scope of the present invention. While the first and second annular chambers are separated by the bulkhead 86, it is possible to provide fluidic communication between the chambers through a plurality of bores 155, as shown in FIGS. 2, 3 and 7. It is also possible to omit the bores 155 depending on operational characteristics desired for a particular viscous differential.

The axles 58 and 60 are secured to the viscous differential 10 through a releasable interference fit with a "C" clip, 154a and 154b, respectively. Each "C" clip is formed in a part annular shape as shown in FIG. 11. The outer periphery 156 of the "C" clip is circular, while the inner periphery 157 of the "C" clip has a circular portion 158 which ends in straight portions 160. The "C" clip has on either side a recess 159 which is adjacent to and follows the curvature of the inner periphery 157. Thus, a shoulder 162 is formed by the recess which follows the inner periphery; the shoulder, thus, has a circular portion 158' which ends in straight portions 160'. The diameter of the circular portion 158' of the shoulder of the "C" clip is slightly larger than the diameter of the annular slots 66a and 66b of the respective axles 58 and 60. Consequently, the axles 58 and 60 may be inserted into the inner periphery of the "C" clip by sliding the "C" clip into the annular slot thereof in the radial direction. The first and second drums 78a and 78b each have an annular recess 164a and 164b respectively on their inside ends 84a and 84b, respectively. Each annular recess 164a and 164b has an inside diameter which is just slightly larger than the outside diameter of the "C" clips. Thus, a "C" clip may be received into the annular recess of the first and second drums. The "C" clip can only enter into the annular recess approximately the thickness, t, of the "C" clip, because each of the annular recesses terminate in a shoulder 168a and 168b, respectively. Therefore, the axles are releasably held in a fixed translational relation to the housing through interference interaction of the "C" clip with the drum in the outward axial direction and the thrust blocks in the inward axial direction.

The operation of the viscous differential 10 and the releasability feature of the axles according to the present invention will now be described.

The viscous differential 10 of the present invention provides a single unit that serves as a conventional differential, allowing the two rear wheels to rotate at different angular velocities when the vehicle makes a turn, as well as an interaxle differential. It is to be appreciated from FIG. 1 that the front wheels are full time driven from the transmission 22 and that the rear wheels are driven on an on demand basis whenever the front wheels slip. The drive shaft 44, through the gears 48, 50 and 54 engages the ring gear 56 on the viscous differential 10, causing its housing 62 to rotate. When the angular velocity of the housing matches that of the rear axles 58 and 60, no torque is delivered to the rear wheels. However, when there is a loss of traction at the front wheels, the drive shaft 44 will turn at a rate such that the housing 62 will rotate at an angular velocity that is faster than that of the rear wheel axles 58 and 60, causing torque to be transferred to the rear wheels.

This automatic, on demand transfer of torque from the front wheels to the rear wheels is accomplished by interaction of the annular plates with the viscous fluid in each of the annular chambers. Because the first set of annular plates 142a and 142b are connected through the straight splines as hereinabove described, they rotate with the angular speed of the axles 58 and 60, respectively. Further, because the second set of annular plates 148a and 148b are connected through the straight splines as hereinabove described, they rotate with the angular velocity of the housing 62. It is well known in the art that a shearing action caused by the different angular speeds of the second set of annular plates causes the fluid to heat and expand thereby causing a transfer of torque between the first and second annular plates. The configuration of the annular plates and the choice of fluid within the first and second annular chambers is selected so that there is very little transfer of torque to the rear wheels from the front wheels when there is a small angular velocity between the axles 58 and 60 with respect to the housing 62 and, further, so that there is a considerable transfer of torque from the front wheels to the rear wheels when there is a large angular velocity difference between the rear axles and the housing, characteristic of a substantial slippage at the front wheels.

Slip between the rear wheels is also limited by the viscous differential 10. This occurs when each of the axles turn at different angular velocities than that of the housing 62 and, further, when one of the rear wheels is experiencing slippage. In such a circumstance, the axle of the rear wheel which is experiencing good traction will tend not to rotate, or rotate much slower than the axle of the rear wheel which is slipping. Accordingly, the first set of annular plates associated with the axle of the slipping rear wheel will tend to rotate more nearly at the angular velocity of the second set of annular plates than will the first set of annular plates associated with the axle of the rear wheel which is experiencing better traction. What this means is that more heating and expansion of fluid will occur in the annular chamber having the first annular plates associated with the axle of the rear wheel having better traction, resulting in a greater transfer of torque to the more tractive rear wheel than the slipping rear wheel.

The releasable mounting of the axles is accomplished as follows. The rear axles 58 and 60 are slid into the hub 64a and 64b, respectively. One of the axles is then pushed into the interaxle cavity within the bulkhead 86, the interaxle cavity forming a part of the substantially rectangularly-shaped cavity 95 in the viscous differential 10, so that the annular slot 66a or 66b, respectively, is exposed. The "C" clip 154a or 154b is then, respectively, slipped onto the annular slot and the respective axle is then pulled outwardly from the housing so that the "C" clip seats in the recess 164a or 164b in the respective first or second drum 78a or 78b. The same procedure is repeated for the other of the two axles 58 and 60. The thrust blocks 96a and 96b, oriented as they are shown in FIG. 7, are now slipped into the substantially rectangularly-shaped cavity 95. The retainer pins 114 are now inserted into the housing and bulkhead apertures 116 and 118, respectively, and into the cylindrical bore 112 of the thrust block, and then tightened. The axles 58 and 60 are now translatably fixed in relation to the housing. To remove the axles from the housing, the reverse of the steps hereinabove recited are used. It is understood that the viscous differential 10 may be mounted and demounted from the vehicle without disassembly of the internal components of the annular chambers, thus, greatly facilitating servicing of the vehicle.

FIGS. 14 and 15 are directed to an alternative embodiment of the viscous differential 10' according to the present invention, wherein a retainer clip 170 is used instead of the thrust blocks. The retainer clip is made of a spring steel material which allows for resilient deformation. As can be understood from FIG. 15, a retainer clip 170 inserts in the substantially rectangularly-shaped cavity 95'. The concave portion 91' of the cut-out 92' and the bulkhead 86' receives a part circularly curved portion 172 of the retainer clip. A cylindrical extension member 174 inserts through the housing 62' and bulkhead apertures 116' and 118' and further has a protruding portion 176 which extends into the concave portion 91'. An aperture 178 is provided on each side of the retainer clip for receiving the extension members 174. The retainer clip 170 is provided with a recess portion 180 on either side adjacent the housing, while allowing clearance with respect to the axle ends 68a and 68b, respectively. The operation of the alternative embodiment of the viscous differential is the same as that described hereinabove, except that instead of removing the thrust blocks, the retainer clip 170 is removed. Removal of the retainer clip 170 is accomplished by pressing on surfaces 182a and 182b or surfaces 184a and 184b. The deformation of the retainer clip resulting from pressing on the surfaces will cause the protruding portion 176 of the extension members 174 to disengage the apertures 178 of the retainer clip, allowing the retainer clip to be slid out of the substantially rectangularly-shaped cavity 95'. The "C" clips may now be removed from the axles in the manner hereinabove described.

While the environment for the foregoing description of the viscous differential according to the present invention is the rear axle of a four-wheel drive vehicle, it is clear to those skilled in the relevant art that the invention herein described is not restricted solely to that environment of use. For example, the viscous differential of the present invention may be used in a vehicle employing, alternatively, rear wheel drive alone, front wheel drive alone (in which case the axles interfacing with the viscous differential would be the front axles of the vehicle) or rear wheel drive having on demand four-wheel drive by virtue of the invention being connected to the front wheel axles.

To those skilled in the art to which this invention appertains, the above described preferred embodiment may be subject to change or modification. Such changes or modifications can be carried out without departing from the scope of the invention which is intended to be limited only by the scope of the appended claims.

What is claimed is:

1. A limited slip viscous differential between a first axle, a second axle, and a third axle, comprising:
a housing having a first end and a second end, said housing having a first axle hub at said first end thereof for receiving said first axle, said housing having a second axle hub at said second end thereof for receiving said second axle, said housing further having an inner surface of cylindrical shape;

first connection means on said housing for rotatably connecting said housing to said third axle;

a first drum rotatably mounted in said housing adjacent said first end thereof, said first drum having an outer surface spaced from said inner surface of said housing, said outer surface of said first drum and said inner surface of said housing defining a first chamber;

second connection means on said first drum and said first axle for causing said first drum to rotate with said first axle and for permitting said first axle to be slidable relative to said first drum;

a second drum rotatably mounted in said housing adjacent said second end thereof, said second drum having an outer surface spaced from said inner surface of said housing, said outer surface of said second drum and said inner surface of said housing defining a second chamber;

third connection means on said second drum and said second axle for causing said second drum to rotate with said second axle and for permitting said second axle to be slidable relative to said second drum;

an annular bulkhead disposed in said housing between said first and second drums and separating said first chamber from said second chamber, said annular bulkhead having a cut-out provided diametrically therethrough;

at least one thrust block inserted in said cut-out to maintain a predetermined interaxial space between the adjacent ends of said first and second axles;

a first set of first drum annular plates attached to said outer surface of said first drum;

a second set of first drum annular plates attached to said inner surface of said housing, said second set of first drum annular plates interleaving said first set of first drum annular plates;

a first set of second drum annular plates attached to said outer surface of said second drum;

a second set of second drum annular plates attached to said inner surface of said housing, said second set of second drum annular plates interleaving said first set of second drum annular plates; and a high viscosity fluid contained in said first and second chambers for transferring torque from said third axle to at least one of said first and second axles when at least one of said first and second axles rotate at an angular velocity different from that of said housing.

2. The limited slip viscous differential of claim 1, wherein said bulkhead has at least one passage for permitting fluidic communication between said first chamber and said second chamber.

3. The limited slip viscous differential of claim 1, further comprising means for retaining said first axle in said first axle hub and for rotationally fixing said first axle to said first drum; and means for retaining said second axle in said second axle hub and for rotationally fixing said second axle to said second drum.

4. The limited slip viscous differential of claim 3, wherein said means for releasably retaining said first and second axles comprising:

said first axle having one end within said housing, said first axle having an annular slot adjacent said one end thereof;

said first drum having an annular recess provided at the end thereof opposite said first axle hub;

a first "C" clip receivable in said annular slot in said first axle such that when said first axle protrudes into said interaxle space said first "C" clip is receivable in said annular slot in said first axle and when said first axle is axially displaced out of said interaxle space said first "C" clip is received in said annular recess in said first drum so as to maintain said first "C" clip in said annular slot and to prevent said first axle from sliding in a direction outward from said housing;

said second axle having one end within said housing, said second axle having an annular slot adjacent said one end thereof;

said second drum having an annular recess provided at the end thereof opposite said second axle hub; and a second "C" clip receivable in said annular slot in said second axle such that when said second axle protrudes into said interaxle space said second "C" clip is receivable in said annular slot in said second axle and when said second axle is axially displaced out of said interaxle space and said second "C" clip is received in said annular recess in said second drum so as to maintain said second "C" clip in said annular slot and to prevent said second axle from sliding in a direction outward from said housing.

5. The limited slip viscous differential of claim 4, wherein said first and second "C" clips have an inner periphery that has a circular portion and a straight portion, said first and second "C" clips further having an outer periphery that is circular, said first and second "C" clips having a outer peripheral portion having a first thickness, said outer periphery being receivable by said annular recess in said first and second drums, said first and second "C" clips having an inner peripheral portion of a second thickness which is less than that of said first thickness of said outer peripheral portion, said inner peripheral portion being receivable by said annular slots in said first and second axles; said annular recess in said first and second drums having a depth equal to at least said first thickness of said outer peripheral portion of said first and second "C" clips.

6. The limited slip viscous differential of claim 4, wherein said housing has at least one cut-out; and wherein said cut-out provided in said annular bulkhead is a substantially rectangular cut-out aligned with said at least one cut-out of said housing such that said interaxle space is accessible so that said first and second "C" clips may be inserted in and removed from said first and second axles, respectively.

7. The limited slip viscous differential of claim 6, wherein said housing has two cut-outs, one on either side of said annular bulkhead and wherein said cut-out provided in said annular bulkhead is a substantially rectangular cut-out such that said two cut-outs in said housing in combination with said substantially rectangular cut-out of said annular bulkhead form a continuous substantially rectangular cavity through said limited slip viscous differential.

8. The limited slip viscous differential of claim 7, further comprising a pair of thrust blocks removably receivable in said substantially rectangular cavity, each thrust block of said pair of thrust blocks comprising:

an elongate rectangular portion having a central bore; and a right angle extension portion integral with said elongate rectangular portion, such that said pair of thrust blocks may be placed side by side in mutually opposing orientation within said substantially rectangular cavity to prevent said first and second axles from sliding in a direction inward in relation to said housing.

9. The limited slip viscous differential of claim 8, wherein said annular bulkhead has a pair of apertures, said limited slip viscous differential further comprising a pair of retainer pins, one retainer pin of said pair of retainer pins being removably received in each aperture of said pair of apertures in said annular bulkhead and protrudes into a cylindrical bore of a respective one of said thrust block of said pair of thrust blocks.

10. The limited slip viscous differential of claim 9, wherein said right angle extension portion on each thrust block of said pair of thrust blocks has an outer periphery of part circular shape, such that when said pair of thrust blocks are located in said substantially rectangular cavity, said outer periphery of each of said thrust blocks complements the peripheral surface of said annular bulkhead.

11. The limited slip viscous differential of claim 10, wherein said second connection means comprises splines along the inner surface of said first drum which mesh with splines provided on said first axle; further wherein said third connection means comprises splines provided along the inner surface of said second drum which mesh with splines provided on said second axle.

12. The limited slip viscous differential of claim 11, wherein said first connection means is a ring gear provided on said housing in mesh with a gear connected to said third axle.

13. The limited slip viscous differential of claim 7, further comprising at least one retainer pin connected to said housing and protruding into said substantially rectangular cavity; and a retainer clip removably retained in said substantially rectangular cavity by said at least one retainer pin.

14. The limited slip viscous differential of claim 13, wherein said second connection means comprises splines on the inner surface of said first drum in mesh with splines on said first axle; further wherein said third connection means comprises splines on the inner surface of said second drum in mesh with splines on said second axle.

15. The limited slip viscous differential of claim 14, wherein said first connection means comprises a ring gear provided on said housing in mesh with a gear connected to said third axle.

16. A limited slip viscous differential between a first axle, a second axle, and a third axle, comprising:
a housing having a first end and a second end, said housing having a first hub at said first end thereof for receiving said first axle, said housing having a second hub at said second end thereof for receiving said second axle, said housing further having an inner surface of cylindrical shape;
first connection means for rotatably connecting said housing to said third axle;
a first drum rotatably mounted in said housing adjacent said first hub, said first drum having an outer surface spaced from said inner surface of said housing, said outer surface of said first drum and said inner surface of said housing defining a first chamber;
second connection means for causing said first drum to rotate with said first axle and for permitting said first axle to be slidable relative to said first drum;
a second drum rotatably mounted on said housing adjacent said second hub, said second drum having an outer surface spaced from said inner surface of said housing, said outer surface of said second drum and said inner surface of said housing defining a second chamber;
third connection means for causing said second drum to rotate with said second axle and for permitting said second axle to be slidable relative to said second drum;
an annular bulkhead disposed in said housing between said first and second drums to provide for an interaxial space between the adjacent end of said first and second axles, said annular bulkhead further separating said first chamber from said second chamber;
a first set of first drum annular plates attached to said outer surface of said first drum;
a second set of first drum annular plates attached to said inner surface of said housing, said second set of first drum annular plates interleaving said first set of first drum annular plates;
a first set of second drum annular plates attached to said outer surface of said second drum;
a second set of second drum annular plates attached to said inner surface of said housing, said second set of said second drum annular plates interleaving said first set of second drum annular plates;
a high viscosity fluid in said first and second chambers for transferring torque from said third axle to at least one of said first and second axles when at least one of said first and second axles rotate at an angular velocity different from that of said housing;
means for retaining said first axle in said first axle hub and for rotationally fixing said first axle to said first drum; and
means for retaining said second axle in said second axle hub and for rotationally fixing said second axle to said second drum.

17. The limited slip viscous differential of claim 16, wherein said annular bulkhead disposed in said housing has a cut-out passing diametrically therethrough.

18. The limited slip viscous differential of claim 16, wherein said bulkhead has at least one passage for permitting fluidic communication between said first chamber and said second chamber.

19. The limited slip viscous differential of claim 18, wherein said means for retaining said first and second axles comprises:
said first axle having an annular slot adjacent the end thereof within said housing;
said first drum having an annular recess provided at the end thereof opposite said first axle hub;
a first "C" clip receivable in said annular slot in said first axle when said first axle protrudes into said interaxle space and when said first axle is displaced out of said interaxle space said first "C" clip is received in said annular recess in said first drum so as to prevent said first axle from further sliding in a direction outward in relation to said housing;
said second axle having an annular slot adjacent the end thereof within said housing;
said second drum having an annular recess at the end thereof opposite said second axle hub; and
a second "C" clip receivable in said annular slot in said second axle when said second axle protrudes into said interaxle space and when said second axle is displaced out of said interaxle space said second "C" clip is received in said annular recess in said second drum so as to prevent said second axle from further sliding in a direction outward from said housing.

20. The limited slip viscous differential of claim 19, wherein said first and second "C" clips have an inner periphery that has a circular portion and a straight portion, said first and second "C" clips further having an outer periphery that is circular, said first and second "C" clips having a outer peripheral portion having a first thickness, said outer periphery being receivable by said annular recess in said first and second drums, said first and second "C" clips having an inner peripheral portion of a second thickness which is less than that of said first thickness of said outer peripheral portion, said inner peripheral portion being receivable by said annular slots in said first and second axles; said annular recesses in said first and second drums having a depth equal to at least said first thickness of said outer peripheral portion of said first and second "C" clips.

21. The limited slip viscous differential of claim 20, wherein said housing has at least one cut-out; and wherein said cut-out provided in said annular bulkhead has a substantially rectangular cut-out such that said interaxle space is accessible to permit said first and second "C" clips to be inserted into said annular slots of said first and second axles, respectively.

22. The limited slip viscous differential of claim 20, wherein said housing has two cut-outs, one on either side of said annular bulkhead; and wherein said annular bulkhead has a substantially rectangular cut-out such that said two cut-outs in said housing in combination with said substantially rectangular cut-out and said annular bulkhead form a substantially rectangular cavity through said limited slip viscous differential.

23. The limited slip viscous differential of claim 22, further comprising a pair of thrust blocks removably received in said substantially rectangular cavity, each thrust block of said pair of thrust blocks, comprising:
   an elongate rectangular portion, having a central bore; and
   a right angle extension portion integral with said elongate rectangular portion, such that said pair of thrust blocks may be placed side by side in mutually opposing orientation in said substantially rectangular cavity so as to prevent said first and second axles from sliding in a direction inward in relation to said housing.

24. The limited slip viscous differential of claim 23, wherein said annular bulkhead has a pair of apertures, said limited slip viscous differential further comprising a pair of retainer pins, one retainer pin of said pair of retainer pins being removably received in each aperture of said pair of apertures in said annular bulkhead and protrudes into a cylindrical bore of a respective one thrust block of said pair of thrust blocks.

25. The limited slip viscous differential of claim 24, wherein said housing has a cylindrical shape and wherein said right angle extension portion on each thrust block of said pair of thrust blocks has an outer periphery of part circular shape, such that when said pair of thrust blocks are located in said substantially rectangular cavity, said outer periphery of each of said thrust blocks complement the peripherial surface of said annular bulkhead.

26. The limited slip viscous differential of claim 25, wherein said second connection means comprises female splines provided through said first drum in mesh with male splines provided on said first axle; further wherein said third connection means comprises female splines provided through said second drum in mesh with male splines provided on said second axle.

27. The limited slip viscous differential of claim 26, wherein said first connection means comprises a ring gear on said housing in mesh with a gear connected to said third axle.

28. The limited slip viscous differential of claim 22, further comprising at least one retainer pin connected to said housing and protruding into said substantially rectangular cavity; and a retainer clip removably retained in said substantially rectangular cavity by said at least one retainer pin.

29. The limited slip viscous differential of claim 28, wherein said second connection means comprises female splines provided axially through said first drum in mesh with male splines provided on said first axle; further wherein said third connection means comprises female splines provided axially through said second drum in mesh with male splines provided on said second axle.

30. The limited slip viscous differential of claim 29, wherein said first connection means comprises a ring gear on said housing in mesh with a gear connected with said third axle.

31. A limited slip viscous differential between a first axle having an annular slot adjacent one end thereof, and a second axle having an annular slot adjacent one end thereof, and a third axle, comprising:
   a housing having a first end and a second end, said housing having a first hub at said first end thereof for receiving said first axle, said housing having a second hub at said second end thereof for receiving said second axle, said housing further having an inner surface of cylindrical shape;
   means on said housing gearingly connecting said housing to said third axle;
   a first drum rotatably mounted in said housing adjacent said first hub, said first drum having an outer surface spaced from said inner surface of said housing, said outer surface of said first drum and inner surface of said housing defining a first chamber, said first drum having an annular recess adjacent one end thereof;
   means on said first drum and said first axle for causing said first drum to rotate with said first axle and for permitting first axle to be slidable relative to said first drum;
   a second drum rotatably mounted in said housing adjacent said second hub, said second drum having an outer surface spaced from said inner surface of said housing, said outer surface of said drum and said inner surface of said housing defining a second chamber, said second drum having an annular recess adjacent one end thereof, said second drum being spaced from said first drum thereby forming an interaxle space;
   means on said second drum and said second axle for causing said second drum to rotate with said second axle and for permitting said second axle to be slidable relative to said second drum;
   a first set of first drum annular plates attached to said outer surface of said first drum;
   a second set of first drum annular plates attached to said inner surface of said housing, said second set of first drum annular plates interleaving said first set of first drum annular plates;
   a first set of second drum annular plates attached to outer surface of said second drum;

a second set of second drum annular plates attached to said inner surface of said housing, said second set of second drum annular plates interleaving said first set of said first drum annular plates;

a high viscosity fluid contained in said first and second chambers for transferring torque from said third axle to at least one of said first and second axles when at least one of said first and second axles rotate at an angular velocity different from that of said housing;

a bulkhead in said housing for at least partially separating said first chamber from said second chamber, said bulkhead having a cut-out therein which includes said interaxle space; said housing having at least one cut-out, said cut-out in said bulkhead and at least one cut-out in said housing combining to form a substantially rectangular cavity in said limited slip viscous differential;

a first "C" clip receivable by said annular slot in said first axle and said annular recess in said first drum, such that when said first axle protrudes in said interaxle space said first "C" clip is receivable by said annular slot in said first axle and when said first axle no longer protrudes into said interaxle space and said first "C" clip is received by said annular slot in said first axle said first "C" clip is received by said annular recess in said first drum so as to prevent said first axle from sliding in a direction outward from said housing;

a second "C" clip receivable by said annular slot in said second axle in said annular recess in said second drum, such that when said second axle protrudes into said interaxle space said second "C" is receivable by said annular slot and said second axle and when said second axle no longer protrudes into said interaxle space and said second "C" clip is received by said annular slot in said second axle said second "C" clip is received by said annular recess in said second drum so as to prevent said second axle from sliding in a direction outward from said housing;

a pair of thrust blocks removably retained in said substantially rectangular cavity, each thrust block of said pair of thrust blocks, comprising:

an elongate rectangular portion, said elongate rectangular portion having a recess portion on either side thereof; and a right angle extension portion integral with said elongate rectangular portion, such that said pair of thrust blocks may be placed side by side in mutually opposing orientation within said substantially rectangular cavity and said first and second axles are received by said recess portion thereof so as to prevent said first and second axles from sliding in a direction inward in relation to said housing.

32. A limited slip viscous differential for driving a first and second axle in response to a rotary input, comprising:

a housing having a first axle hub receiving said first axle, a second axle hub receiving said second axle in axial alignment with said first axle, and an inner chamber having a cylindrically shaped surface;

means for connecting said housing to said rotary input to rotate said housing about an axis concentric with said first and second axles;

an annular bulkhead disposed in said housing separating said inner chamber into a first chamber and a second chamber, said annular bulkhead having an axial aperture provided therethrough and a cut-out passing diametrically therethrough intersecting said axial aperture;

a first drum disposed in said first chamber between said first axle hub and said annular bulkhead, said first drum being rotatably connected to said first axle for rotation therewith and slidably connected to said first axle to permit axial displacement of said first axle relative to said first drum;

a second drum rotatably disposed in said second chamber between said second axle hub and said annular bulkhead, said second drum being rotatably connected to said second axle for rotation therewith and slidably connected to said second axle to permit axial displacement of said second axle relative to said second drum;

means for inhibiting the axial displacement of said first and second axles in a direction away from said annular bulkhead;

means disposed in said cut-out of said annular bulkhead for inhibiting the axial displacement of said first and second axles in a direction towards each other;

a first set of annular plates connected to said first drum and rotatable therewith;

a second set of annular plates interleaved with said first set of annular plates in said first chamber, said second set of annular plates being connected to said housing and rotatable therewith;

a third set of annular plates connected to said second drum and rotatable therewith in said second chamber;

a fourth set of annular plates interleaved with said third set of annular plates in said second chamber, said fourth set of annular plates being connected to said housing and rotatable therewith; and a viscous fluid disposed in said first and second chambers to transfer torque between said first and second set of annular plates and between said third and fourth set of annular plates.

33. The limited slip viscous differential of claim 32 wherein each of said first and second axles has an annular slot provided at the end adjacent to said annular bulkhead, said means for inhibiting the axial displacement of said first and second axles away from said annular bulkhead is a first "C" clip received in said annular slot provided in said first axle and a second "C" clip received in said annular slot provided in said second axle, said first and second "C" clips engaging the ends of said first and second drums, respectively, to prohibit the axial displacement of said first and second axles in a direction away from said annular bulkhead.

34. The limited slip viscous differential of claim 33 wherein said first drum has a first annular recess provided at the end adjacent to said annular bulkhead, and said second drum has a second annular recess provided at the end adjacent to said annular bulkhead, said first and second annular recesses circumscribing said first and second "C" clips, respectively, prohibiting the radial displacement of said first and second "C" clips from said annular slots provided in said first and second axles.

35. The limited slip viscous differential of claim 32 wherein said means for inhibiting the axial displacement of said first and second axles in a direction towards each other comprises at least one thrust block removably received in said cut-out between the adjacent ends of said first and second axles.

36. The limited slip viscous differential of claim 35 wherein said cut-out is a rectangular cut-out.

37. The limited slip viscous differential of claim 36 wherein said at least one thrust block comprises two thrust blocks of identical shape; each of said two thrust blocks having an elongated rectangular portion having a recess provided on opposite sides thereof and a right angle extension portion, said two thrust blocks being disposed in said rectangular cut-out in a mutually opposing orientation with the ends of said first and second axles being received in said recess provided on said opposite sides of said elongated portions.

38. The limited slip viscous differential of claim 37 wherein each of said two thrust blocks is retained in said rectangular cut-out by a pin passing through said annular bulkhead into a pin hole provided in each of said two thrust blocks.

39. The limited slip viscous differential of claim 38 wherein said pin is threadably received in said annular bulkhead and wherein said housing has an aperture concentric with each of said pins to permit insertion and removal of said pins.

40. The limited slip viscous differential of claim 39 wherein said housing has at least one rectangular aperture mating with said rectangular cut-out to permit each of said two thrust blocks to be inserted into and removed from said rectangular cut-out.

41. The limited slip viscous differential of claim 32 wherein said annular bulkhead has at least one fluid passageway therethrough to permit fluid communication between said first and said second chambers.

* * * * *